United States Patent [19]

Kotnour et al.

[11] Patent Number: 4,843,134
[45] Date of Patent: Jun. 27, 1989

[54] ACRYLATE PRESSURE-SENSITIVE ADHESIVES CONTAINING INSOLUBLES

[75] Inventors: Thomas A. Kotnour, Cottage Grove; Ronald L. Barber, Oakdale; Walter L. Krueger, St. Paul, all of Minn.

[73] Assignee: Minnesota Mining and Manufacturing Company, St. Paul, Minn.

[21] Appl. No.: 127,611

[22] Filed: Nov. 30, 1987

Related U.S. Application Data

[63] Continuation of Ser. No. 21,137, Mar. 3, 1987, abandoned, which is a continuation of Ser. No. 852,437, Apr. 15, 1986, abandoned, which is a continuation of Ser. No. 594,278, Mar. 28, 1984, Pat. No. 4,619,979.

[51] Int. Cl.$^4$ .............................................. C08F 2/02
[52] U.S. Cl. ................... 526/318.4; 526/320; 526/328; 526/328.5; 526/329.2
[58] Field of Search ............ 526/318.4, 320, 328, 526/328.5, 329.2

[56] References Cited

U.S. PATENT DOCUMENTS

| | | | |
|---|---|---|---|
| Re. 24,906 | 12/1960 | Ulrich | 206/59 |
| 2,925,174 | 11/1956 | Stow | 428/355 |
| 2,973,286 | 2/1961 | Ulrich | 117/122 |
| 3,234,303 | 2/1966 | Bild et al. | 260/876 |
| 3,821,330 | 6/1974 | Free | 260/885 |
| 4,065,613 | 12/1977 | Logothetis | 526/320 |
| 4,137,389 | 1/1979 | Wingler et al. | 526/86 |
| 4,141,806 | 2/1979 | Keggenhoff | 526/318.4 |
| 4,181,752 | 1/1980 | Martens et al. | 427/431 |
| 4,276,432 | 6/1981 | Rhum et al. | 560/190 |
| 4,287,013 | 9/1981 | Ronning | 428/356 |
| 4,367,745 | 1/1983 | Welage | 428/327 |
| 4,413,080 | 11/1983 | Blake | 428/355 |
| 4,487,897 | 12/1984 | Matsuoka et al. | 526/64 |
| 4,529,787 | 7/1985 | Schmidt et al. | 526/317 |
| 4,546,160 | 10/1985 | Brand | 526/329.2 |
| 4,605,592 | 8/1986 | Paquette et al. | 428/334 |

FOREIGN PATENT DOCUMENTS

| | | |
|---|---|---|
| 58-16810 | 3/1983 | Japan . |
| 58-53901 | 8/1983 | Japan . |
| 58-53907 | 8/1983 | Japan . |
| 58-53969 | 8/1983 | Japan . |
| 58-53973 | 8/1983 | Japan . |

OTHER PUBLICATIONS

Rauwendaal, C. F., "Analysis and Experimental Evaluation of Twin Screw Extruders", Raychem Corporation, *Polymer Engineering and Science*, Nov. 1981, p. 1092.

*Primary Examiner*—Paul R. Michl
*Assistant Examiner*—Patrick A. Doody
*Attorney, Agent, or Firm*—Donald M. Sell; Walter N. Kirn; Douglas B. Little

[57] ABSTRACT

A bulk polymerization process for free radical polymerization of vinyl monomers in a wiped surface reactor is disclosed. Referring to FIG. 1; monomer streams 5 (after purification and silica gel column 2) and 7 are combined with free radical initiator 9 to form a premix 16. Pump 18 transfers the premix stream 22 through static mixer 24 into a wiped surface reactor 27. The reactor can be a counter rotating twin screw extruder which produces polymer stream 36 without the need of solvent and using residence times much shorter than prior art solution or emulsion processes.

Some unique pressure sensitive adhesive acrylate polymers have been produced. They are believed to have a relatively high degree of branching. The bulk polymerization process permits the manufacture of pressure sensitive adhesive articles by extruding directly from the twin screw extruder onto a substrate.

3 Claims, 2 Drawing Sheets

ACRYLATE PRESSURE-SENSITIVE ADHESIVES CONTAINING INSOLUBLES

This is a continuation of application Ser. No. 21,137 filed Mar. 3, 1987, now abandoned, which is a continuation of application Ser. No. 852,437, filed Apr. 15, 1986, now abandoned, which is a continuation of Ser. No. 594,278, filed Mar. 28, 1984, U.S. Pat. No. 4,619,979.

TECHNICAL FIELD

This invention relates to a continuous process for the polymerization of free radical polymerizable vinyl compounds. More particularly, it relates to the application of wiped surface reactors, such as counter rotating twin screw extruders, to such polymerization processes.

BACKGROUND

The prior art teaches the manufacture of pressure sensitive adhesive (PSA) compositions by solution and emulsion polymerizations. PSA produced by solution polymerization may be diluted with a solvent and coated in a thin layer on a backing material by processes well known in the adhesives art. In coating articles such as tapes with solution polymer PSAs, elaborate drying ovens have been required to carry away the volatile solvents after coating. Furthermore, to prevent the solvents from being vented to the atsmophere with resulting pollution and solvent loss, expensive solvent recovery equipment has been required. Safety hazards in such operations are also severe, as the solvents are flammable and precautions must be taken to avoid explosive mixtures in the oven and exhaust systems.

While emulsion polymerization has potentially eliminated the problems associated with handling and evaporation of flammable solvents (e.g., when adhesive is applied as a latex to a tape backing) the heat of vaporization of water must be supplied to dry the coating, and essentially the same drying equipment as used in solution coating must be employed. Direct coating of latices can give a coating with increased moisture sensitivity due to residual emulsifiers, and there are backings and substrates which are sensitive to moisture. Latex requires a higher drying temperature than solution polymers, and latex can lack stability in storage and handling, forming coagulum and plugging equipment.

DISCLOSURE OF INVENTION

This invention provides a new process for continuous, bulk polymerization of vinyl compounds, particularly of pressure sensitive adhesives and for direct coating of the polymerized PSA onto useful articles without the need for solvents.

The invention can be summarized as a process of polymerizing one or more free radical polymerizable vinyl compounds, which may be in the liquid or solid state, which process comprises:
(a) continuously feeding to a wiped surface reactor raw materials which comprise the vinyl compounds and at least two initiators for free radical polymerization, under the following conditions:
  (i) all raw materials being fed substantially free of oxygen, and
  (ii) any liquid vinyl compounds having a viscosity less than about 4000 centipoise being fed under a pressure at least as high as the vapor pressure of the combined raw materials at the temperature to which the exotherm of the free radical polymerization brings them in the reactor;
(b) reacting the raw materials to desired conversion; and
(c) continuously withdrawing a polymeric material from the reactor.

This invention avoids the problems associated with both solution and emulsion polymerization by using bulk polymerization and it overcomes certain difficulties that arise from the nature of bulk polymerization. One main difficulty is that of mixing and proper heat transfer caused by poor thermal conductivity of the viscous reaction mass. Other difficulties associated with bulk polymerization are the transport of the viscous reaction mass, the production of gel, and loss of control over molecular weight distribution. Good mixing, transport, and control over molecular weight distribution are attained through use of the wiped surface reactor.

A wiped surface reactor comprises a shell or vessel which contains at least one rotor having a wiping portion located close to the inside surface of the shell and a root portion which is spaced substantially further from the shell than the wiping portion. As the rotor is rotated, the wiping portion passes close enough to the inside surface of the shell to clean the surface and form a seal when the reactor contains monomer and/or polymer but not so close as to cause permanent deformation of either the rotor or shell. It is necessary that the root surface of the rotor also be wiped or cleaned continuously during operation of the reactor.

Intermeshing twin screw extruders may be used as wiped surface reactors. The screws comprise the rotors and the flight lands comprise the wiping portion, while the screw root surface between the flight lands comprises the root surface. Although corotating twin screw extruders may be used, counter-rotating twin screw extruders are preferred. The counter-rotating extruder acts as a positive displacement pump conveying the reacting stream, and it also behaves like a series of small mixing zones or continuous stirred tank reactors. The counter-rotating twin screw extruder also gives good control over the reaction temperature. The counter-rotating twin screw extruder made by Leistritz GmBH of Nurnberg, West Germany is suitable for this process.

The term "substantially free of oxygen" means havang an oxygen concentration sufficiently low that it is not a serious inhibitor to free radical polymerization.

Feeding a low viscosity (e.g. 1 centipoise) liquid to an extruder entails certain problems. One such problem is forming a plug to prevent channeling of the liquid down the extruder during start-up. However, the inventive process overcomes such problems by adding a pressure feed system with limited volumetric transport rate when liquid monomers are fed to the wiped surface reactor and by using a multi-part (i.e. more than one) initiator system. This pressure mentioned in part (ii) of the description above is usually at least about 240 kPa absolute (35 psi absolute). The process can be made to work without pressure feed or with only one initiator, but both improvements are preferred.

Some unique compositions made by the above-described process are included within the scope of this invention. These compositions include acrylate polymers which are preferably comprised of a major portion derived from at least one alkyl ester of acrylic or methacrylic acid (the alkyl group containing from about one to 14 carbon atoms) such as methyl methacrylate, ethylacrylate, 2-ethylhexyl acrylate, 2-ethylexyl methacrylate, lauryl methacrylate, methyl butyl acrylate, n-butyl acrylate, butyl methacrylate, isooctylacrylate n-octylmethacrylate, and mixtures thereof, and a minor portion of at least one modifying monomer such as acrylic acid, methacrylic acid, acrylamide, acrylonitrile, methacrylonitrile, vinyl acetate, N-substituted acrylamides (e.g. N-isopropyl acrylamide) hydroxyacrylates, N-vinylpyrrolidone, maleic anhydride or itaconic acid. The acrylate PSA polymers of this invention are comprised of monomeric units of which about 70 to 99 percent are preferably derived from the alkyl esters of acrylic acid or methacrylic acid. In addition, when isomeric or branched acrylic acid esters (e.g. 2-ethylhexyl acrylate) are used as monomers, a relatively higher degree of polymer branching and cross-linking can be obtained.

Besides making free radical pressure sensitive adhesive polymers, other chemistries for this process are: ionic polymerization, step growth polymerization, graft polymerization, and the manufacture of reactive blends.

The advantages of the inventive process are attributable to both the inherent cost benefits from solvent-free continuous processing and the impact on the total process of manufacturing articles coated with PSAs. For example, when prior art PSAs are coated out of solution, some substrates are sensitive to the solvents and/or heat used. This requires initially coating a PSA solution onto a liner (e.g. release paper) and drying the adhesive while it is on the liner, and afterward, transferring the adhesive from the liner to the desired substrate or base. Using the inventive process, the PSA can be coated onto the desired substrate immediately after exiting the wiped surface reactor, since there is, in most cases, no solvent to be driven off.

Prior art hot melt adhesives are made by: first either stripping off solvent (if adhesive is a solution polymer) or coagulating the polymer (if polymer is in a latex emulsion,), and then heating the adhesive in a hot melt die. The inventive process may be used to convert certain monomers directly and extrude hot melt adhesive onto a substrate (e.g. a tape backing) at the end of the extruder, thus eliminating at least one step.

Another example is in processes for manufacturing pressure-sensitive adhesive tape which have a drying step. The tape backing must necessarily have a relatively high strength in order to withstand the stress of travelling through the drying oven at high speeds and high temperatures. The inventive process would permit the use of lower cost backings by eliminating this necessity for high tensile stresses under high temperatures, since no drying step is required.

DETAILED DESCRIPTION

Figure 1:
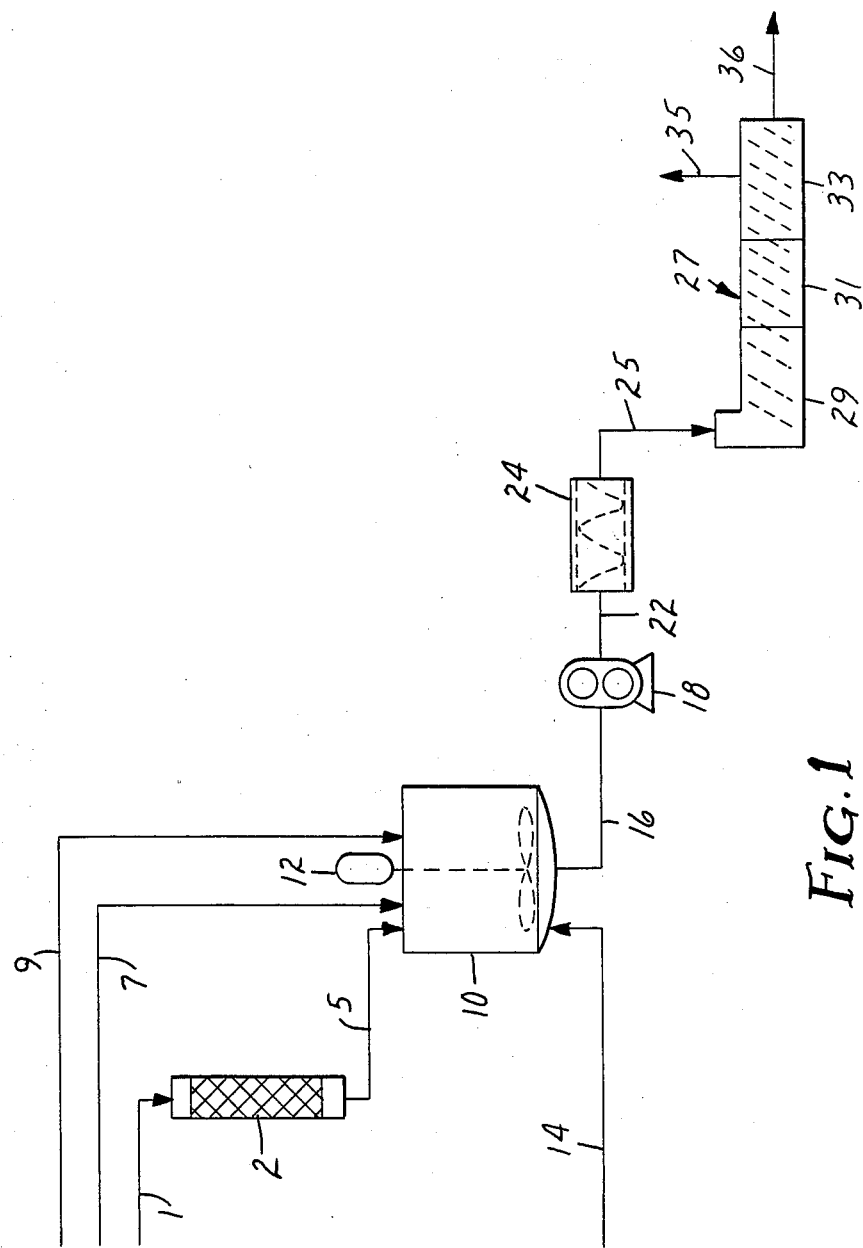
FIG. 1 is a diagramatic flow sheet representation of the process of the present invention. It is an exemplary embodiment, and the process is not limited to the arrangement shown. The symbols represent chemical unit operations, and ancillary equipment such as spare pumps and valves have not been illustrated. Also, secondary process streams such as utility lines (e.g. cooling water) have been omitted.

FIG. 1 represents a flow sheet for an embodiment of the inventive process directed toward making an isooctylacrylate/acrylic acid copolymer PSA. A stream 1 of isooctylacrylate monomer flows through a packed column 2 which is packed with an adsorbent such as silica gel. The effluent stream 5 leaving the packed column is mixed together with the comonomer stream 7 (acrylic acid) and the initiator represented by stream 9. All three major constituents are mixed together as a premix in premix tank 10 using agitator 12.

Although just one initiator stream 9 is shown, many possible free radical initiators are known to the art and may be used. Typical free radical polymerization initiators are: organic peroxides, such as benzoyl peroxide, cumene hydroperoxide, di-t-butyl peroxide, lauryl peroxide, azo-group initiators such as azobis-isobutyronitrile, and redox type catalysts which produce free radicals. The initiator system may be a two or three part system which comprises a combination of reagents. One such initiator system is made up of one half methyltricaprylyl ammonium persulfate and one half 2,5-dimethyl-2,5-di(t-butylperoxy)hexane obtained as Lupersol 101 from Pennwalt Corporation.

Other viable initiators are: bis(4-t-butylcyclohexyl)-peroxy bicarbonate (as possible substitute for the methyltricaprylyl ammonium persulfate); lauroyl peroxide (possible substitute for azobis isobutyronitrile); t-butyl perbenzoate, t-butyl hydroperoxide; 2,5-dimethyl-2,5-di-(t-butyl peroxy)hexyne-3, and di-t-butyl diperoxy phthalate (all four being possible substitutes for 2,5-dimethyl-2,5-di(t-butyl peroxy)hexane. Typical concentrations for the initiator are from about 0.001 to 1.0 PHR (parts per hundred parts of monomer by weight).

Chain transfer agents and modifiers well known in the polymerization art may also be included in the premix to modify molecular weight or other polymer properties. Some chain transfer agents which will work in the inventive process are: carbon tetrabromide, hexabromoethane, bromotrichloromethane, 2-mercaptoethanol, t-dodecylmercaptan, isooctylthioglycolate, and cumene.

The premix is maintained under an inert (e.g. nitrogen) atmosphere in order to maintain the premix substantially free of oxygen. After the ingredients of the premix have been mixed together, the agitator 12 is turned off and inert gas stream 14 enters the premix tank, bubbling up through the premix and forming an inert gas blanket over the premix. In the experiments during which the inventive process was reduced to practice, premix tank 10 was made of polypropylene, and agitator 12 was made of metal and was removed from the tank after the initial mixing of the premix ingredients. This removal was a precaution against any adverse catalytic effects which long term exposure to metal might have had.

In many instances, the free radical reaction can take place without diluents, i.e. true bulk polymerization. However, the vinyl compounds or monomers may in some cases require a diluent in order to copolymerize. For example, acrylamides are dissolved in a small amount of a diluent in order to make them miscible with isooctylacrylate. Therefore, the inventive process includes within its scope the use of diluents which are nonreactive in the free radical polymerization being carried out. Such diluents usually comprise less than about 10 weight percent of the premix, and they may be selected from the normal diluents used in solution polymerization, such as: toluene, hexane, pentane, acetone, methyl ethyl ketone, methanol, t-butyl alcohol and isopropanol. Some of the diluents can also serve as chain transfer agents.

The premix is pumped from premix tank 10 via pipe 16 using gear pump 18. The discharge of pump 18, stream 22, flows through static mixer 24. The static mixer has a heating jacket which contains a heating medium to raise the temperature of the premix stream to a range of about 35° to 55° C. The preheated premix stream 25 flows from the static mixer to the inlet of the wiped surface reactor 27. Pump 18 is used to generate the pressure required for the pressure feed to the wiped surface reactor which is important for maintaining process stability.

A representative wiped surface reactor for use as the apparatus diagrammed in FIG. 1 is a twin screw extruder. It is important to realize that there can be a large viscosity gradient through the length of the wiped surface reactor from the inlet zone containing a relatively low viscosity (about 1 cps) liquid to the outlet end containing a very high viscosity PSA. The combination of the extruder screws and barrel together with the very high viscosity polymer mass toward the discharge end of the twin screw extruder cooperate to form a seal preventing the low viscosity liquid at the inlet end from leaking or channeling past the extruder screw flights.

Figure 2:
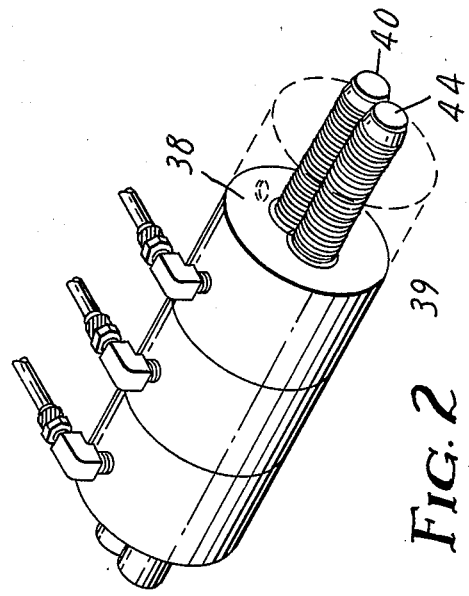
FIG. 2 is a detail pictorial view of a section of the counter rotating twin screw extruder, item 27 in FIG. 1.

Preferably, the counter-rotating twin screw extruder used is divided into sections as illustrated in FIG. 2. For example, the extruder screws 40 and 44 may be composed of a number of separate sections which may fit onto a common drive shaft by means of a keyway and which may be disassembled and rearranged in various orders and orientations. Thus, the screw may have one pitch in the inlet section, another pitch in the middle of the screw length and yet another pitch toward the exit end of the extruder. It is also possible to utilize some screw sections having one start or helix and other screw sections having multiple (i.e. two or three) starts. In addition, while most of the extruder screw sections are oriented to convey the material within the extruder toward the outlet end; one or more screw sections may be reversed (referred to as reversed sections), in order to increase mixing. Furthermore, the barrel 38 of a twin screw extruder may be divided into sections each of which may be either a heating section (i.e. a heating jacket) or a cooling section (i.e. jacket for circulating coolant) or both.

In developing the present process, the laboratory apparatus utilized was a cylindrical counter-rotating twin screw extruder (Leistritz model LSM 30.34GG) having nine barrel and screw sections plus a feed section each 120 mm long and a total length to diameter ratio (L/D) of about 35/1. Greater L/D ratios generally allow higher throughput for a given residence time. The extruder was flood fed, that is the channels of the screws were kept full.

Figure 3:
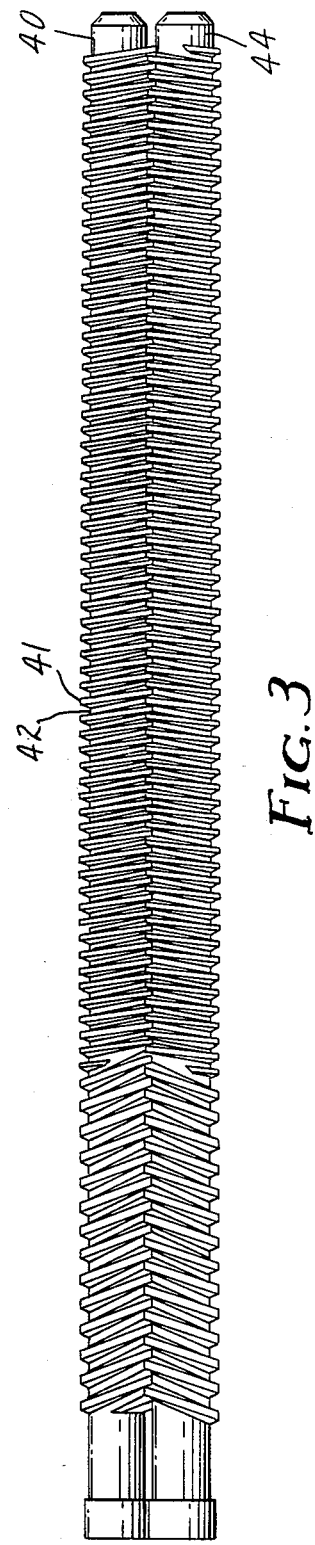
FIG. 3 shows a typical extruder screw profile for a counter rotating twin screw extruder useful in the process of this invention.

FIG. 3 shows how the screw profile can change over the length of the extruder. The width of the flights 41 is preferably about the same as the width of the channel between flights. The orientation of the extruder screws in FIG. 3 is the same as represented for the extruder 27 in FIG. 1 and the extruder section shown in FIG. 2, that is inlet to the left and discharge end to the right.

It is the single start or single helix extruder screw elements shown in about the right half of figure 3 which perform the bulk of the conveying in the process. In the 34 mm diameter laboratory extruder, they were found to convey the reacting mass down the length of the extruder at a rate of about 6mm per revolution of the screws. This relatively slow rate of advance permits high shear rates without short reaction residence times. The pitch of the flights in this section of the extruder was roughly 3.2°. It is believed that higher extruder rotational speeds result in better heat transfer and mixing in the free radical polymerization reaction. In the laboratory extruder used in developing the inventive process, the channels defined by the flights 41 and the screw root surface 42 were roughly 3.5 mm wide and 4mm deep toward the discharge end of the extruder.

As can be seen from FIG. 3 the feed area of the screw has a longer pitch in order to accomodate cleaning pallets which are used to clean the extruder after a reaction run.

Clearances between the inside of the barrel wall 39 and the flight lands of the screws should be in the range of about 0.25 to 0.5 mm. It is desired to have clearances as small as possible without causing deformation or seizing of the machine, since small clearances help to form the seal mentioned earlier. It is also felt that larger clearances cause the formation of more gel than is desirable.

In addition to the viscosity gradient down the length of the extruder which was mentioned earlier, there is also a density gradient. In the isooctylacrylate/acrylic acid polymerization, the specific gravity of the reacting mass varies from roughly 0.87 at the inlet to about 1.0 at the outlet end of the wiped surface reactor. There is also a change in the refractive index as the mass travels down the extruder, and this change is used to monitor reaction conversion.

The counter rotating twin screw extruder of figure 1 is divided into three polymerization zones 29, 31 and 33. In the first zone 29 the reaction initiation with methyltricaprylylammonium persulfate takes place, typically between about 55° and 100° C. for the isooctylacrylate/acrylic acid system. It is desired in this section to obtain rapid initiation and start building high molecular weight polymer. In this section, reaction conversion is fairly linear with time. However, when conversion reaches about 10 to 15 percent, the reaction rate accelerates, and at that point it may be desired to activate a second initiator (e.g. azobisisobutyronitrile) and to increase temperature in the second zone 31. In this zone the reaction rate is quite rapid, going to about 90 percent conversion, and gives off a significant amount of heat which is removed from the cooled extruder barrel. At about 90 percent conversion, the reacting mass is a fairly viscous system and it is desirable to minimize viscosity by maintaining relatively high temperatures and using high shear extruder screw sections so that the remaining unreacted monomers can be contacted and reacted with the growing polymer chains in the third section 33.

The first initiator or initiators used in the reaction are effectively consumed, and in the third high temperature stage, an initiator capable of operating at high temperatures such as 2,5-dimethyl-2,5-di(t-butylperoxy)hexane is preferably used.

It was found advantageous to have a heated hose on the outlet end of the extruder to convey the polymer into a product vessel or coating die. In fact, it was found that the reaction actually proceeded inside the hose which functioned as a tubular reactor, thus increasing the residence time.

Thus, the wiped surface reactor may discharge the polymeric material into a non-wiped surface reactor such as a tubular reactor or a single screw extruder. Using such a non-wiped surface reactor can allow an increase in residence time and throughput (production rate). In the process including the non-wiped surface reactor, the conversion in the wiped surface reactor would be somewhat less than the "desired conversion" mentioned earlier. The polymeric material will have reached desired conversion at the discharge of the non-wiped surface reactor. The inlet viscosity of the reacting stream entering the non-wiped surface reactor must, however, be high enough so that shear stress at the wall can prevent accumulation of a stagnant layer of polymer. Free radical polymerizations will proceed until they are terminated by exposure to oxygen at the outlet end of the reactor.

Residence time distribution of the reactants in the wiped surface reactor is changed by the geometry of the reactor (e.g. screw geometry in a twin screw extruder), the chemistry of the reaction itself, the temperatures at which the extruder barrel sections are controlled, and the rotational speed of the rotor in the wiped surface reactor (e.g. speed of the extruder screws). In the development work which led to the inventive process, residence time in a counter-rotating twin screw extruder has varied from about 1 to 20 minutes, and extruder screw speed has varied between about 20 and 200 rotations per minute. Keeping other reaction conditions constant, the physical properties of the product polymer (intrinsic viscosity, percent insolubles, and molecular weight) can be changed by adjusting extruder screw speed.

The residence times which are typical of the inventive process represent a significant potential productivity increase in production operations, since the prior art processes for manufacturing pressure-sensitive adhesives were typically about 18 hours for solution polymerizations and from about one to four hours for emulsion polymerizations.

In some reactions, there is a need for venting, and this is usually done near the discharge end of the extruder. In FIG. 1 a vent line 35 is shown and would be used in cases where venting was needed to prevent undesirable foaming of the polymer or to effect residual monomer removal. When the extruder is vented, a relatively long pitch screw section is used in the vent zone (e.g. zone eight of a nine-section extruder), and a vacuum (e.g. about 100 mbar or 10 kPa absolute pressure) may be applied to the vent.

Stream 36 on FIG. 1 represents the product polymer as it is discharged from the counter rotating twin screw extruder 27. Once it is exposed to the air, polymerization ceases. At this point, the product stream 36 may be directed into a storage vessel or to some further process step. For example, it may be pumped by a gear pump to a die for coating onto a backing material for purposes of making pressure-sensitive adhesive articles, or it may be co-extruded with some backing material.

Many of the PSA's of this invention require a curing step after they have been extruded in sheet form in order to give them good bond strength and toughness. This step, known as post curing, usually comprises exposing the extruded sheet to some form of radiant energy, such as electron beam or ultraviolet light together with a chemical cross linking agent (N,N dimethyl methylene bisacrylamide). Electron beam post curing is explained in U.S. Pat. No. 3,725,115 in which the radiation dosage is about 0.5 to 12 megarads.

The invention will be further clarified by consideration of the following examples which are intended to be purely exemplary. In these examples, the term $M_w$ means weight average molecular weight, and the term $M_n$ means number average molecular weight, both of which are terms well understood in the polymer art. The term p designates polydispersity which is the ratio of $M_w/M_n$.

The characterization of the molecular weight distribution of polymers has been done by size exclusion chromatography, also known as gel permeation chromatography (GPC). GPC test methods are explained in *Modern Size Exclusion Liquid Chromatography, Practice of Gel Permeation Chromatography*, John Wiley & Sons, 1979.

Viscosity of the soluble portion of the inventive polymers was measured as intrinsic viscosity and/or inherent viscosity in dilute solutions using either tetrahydrofuran or ethylacetate solvent. Inherent viscosity was measured by conventional means in a water bath controlled at about 30° C.

Percent insolubles or gel in the polymer was measured by 20 hour extraction in boiling tetrahydrofuran unless otherwise noted. A polymer sample was placed in a tared filter paper sack which was tied shut and immersed for 20 hours in boiling THF in a Soxhlet extractor. That fraction of the polymer which was not dissolved (i.e. remained on the filter paper) after such treatment was considered to be insoluble. Gel can be minimized or virtually eliminated in some cases by using the pressure feed already described; the multi-part initiators, especially the three-part initiator to be described in Example 3; and a water cooled extruder barrel. Gel may also be reduced by: using methacrylate esters instead of acrylates as monomers; lowering residence time; and using carbon tetrabromide as a chain transfer agent.

When initiator concentrations are reported as percents, that means weight percent based on the total monomer weight in the system being 100%.

Pressures stated in the examples are expressed as gauge pressures. To convert to absolute pressure, about 100 kPa should be added to the pressures reported.

EXAMPLE NO. 1

A process very similar to that described above with regard to FIG. 1 was used to react a premix containing 90 weight percent isooctylacrylate with 10 weight percent acrylic acid, using an initiator of 0.14 percent methyltricaprylyl ammonium persulphate (QAP) and 0.14 percent Lupersol 101. The 34 mm diameter laboratory counter rotating twin screw extruder was used as the reactor. It had: a maximum rotational speed of 250 rpm, a maximum power of 10 horsepower at 15 amps, and the screw and barrel surfaces had been coated with polytetrafluoroethylene (PTFE). The pitch of the extruder screw in the feed section varied from 12 mm to 6 mm and was 6 mm in the last 8 screw sections. Actual feed temperature was about 52° C. and feed pressure was about 140 to 170 kiloPascals (KPa). Output of the wiped surface reactor was about 87 to 94 grams/min. The extruder rotational speed during the reaction was about 60 rpm, and it drew a current of about 3.5 to 3.8 amps. A temperature profile of the counter rotating twin screw extruder is given in Table 1 below.

TABLE 1

| Barrel Section | Temperature (°C.) | Pressure KPa |
| --- | --- | --- |
| 1 | 90 | |
| 2 | 80 | 150–190 |
| 3 | 80 | |
| 4 | 80 | 320–360 |
| 5 | 120 | 230–370 |
| 6 | 150 | 260–390 |
| 7 | 150 | 430–450 |
| 8 | 150 | |
| 9 | 150 | 500–610 |
| end block* | 120 | 690–820 |

*Electrical resistance band heater wrapped around end block.

The product obtained had the following properties: intrinsic viscosity in tetrahydrofuran of 1.62, inherent viscosity in tetrahydrofuran 1.56, and conversion to polymer of about 99.5 percent.

A sample of the product polymer and a control consisting of a solution polymerized 90/10 isooctylacrylate/acrylic acid PSA were analyzed by GPC. GPC requires that the polymer be soluble, and therefore, only the soluble portion of the polymers was so analyzed. The GPC analysis is given in Table 2 below.

TABLE 2

| Sample | $M_w$ | p | % Insolubles by GPC* |
| --- | --- | --- | --- |
| Example 1 | $1.29 \times 10^6$ | 4.3 | 55 |
| Control | $2.44 \times 10^6$ | 5.3 | 5 |

*Percent insolubles by GPC refers to the fraction of the chromatograph sample which failed to pass through a 0.2 micrometer filter prior to injection into the chromatograph column. Samples were prepared for GPC as follows: (1)Each polymer sample was dissolved at a concentration of 2 mg/ml in tetrahydrofuran at room temperature to make a total of about 10 ml. of solution. (2)This solution was treated with saturated solution of diazomethane in tetrahydrofuran by adding 5 ml of such solution drop-wise while stirring. (3)The resulting mixture was heated under a nitrogen atmosphere and reduced to about 5 ml volume by evaporation. (4)Tetrahydrofuran was added to bring sample volume up to 10 ml. (5)The resulting fluid was filtered through a 0.2 micrometer Fluoropore filter (by Millipore Corp.) in a syringe to prevent plugging of the GPC column by the sample. (6)The resulting filtrate was used for chromatographic analysis. Percent insolubles for Example 1 was based on a comparison of the calibrated detector response area for the inventive sample with that of the Control (for a refractive index detector). Dry weight analysis was used to measure the Control percent solubles.

The substantial fraction of insolubles by GPC (GPC insolubles) is notable by comparison to the control. As measured by boiling THF extraction, gel was about 38% of the polymer of Example 1 (as opposed to about 55% GPC insolubles). The substantial concentration of gel is believed to be indicative of cross-linked polymer chains. GPC insolubles are substantial if their concentration is over 15%. Crosslinking is believed more likely with highly branched polymer molecules. Therefore, because of the gel concentration, it is believed that the polymers of this example have a higher degree of branching than acrylate PSA's made by solution processes.

EXAMPLE NO. 2

In this example, a polymer syrup was used as the raw material, comprising a partially reacted mixture of isooctylacrylate and acrylic acid monomers in a 90/10 weight ratio, the mixture having reached a conversion of about 9 percent 5–10% being typical). The use of polymer syrups to make acrylic polymers is explained in U.S. Pat. No. 4,181,752, see especially Column 5, lines 42–56, Column 10, and example 23–25. Other properties of the polymer syrup were: viscosity as measured on a Brookfield viscometer of about 4100 to 4400 cps, water content of about 0.05 weight percent, alcohol content of about 0.4 percent, and intrinsic viscosity of about 2.84.

The counter rotating twin screw extruder used for this example was a 67 mm diameter Leistritz machine having the following characteristics: 5 barrel sections not counting the feed section or end block, L/D of about 25, maximum rotational speed of about 100 rpm, maximum power of 20 horsepower at about 50 amps, and an air cooled barrel. The extruder screws were divided into 12 sections including the tip sections. Screw configuration is given in Table 3.

TABLE 3

| Screw Section | Type | Starts | Pitch (mm) | Length (mm) | Orientation |
| --- | --- | --- | --- | --- | --- |
| 1 | Conveying | 1 | 40 | 60 | FORWARD |
| 2 | Conveying | 3 | 72 | 240 | FORWARD |
| 3 | Compression | 1 | 30–60 | 240 | FORWARD |
| 4 | Conveying | 1 | 31.5 | 292 | FORWARD |
| 5 | Conveying | 1 | 30 | 60 | REVERSE |
| 6 | Conveying | 1 | 30 | 120 | FORWARD |
| 7 | Conveying | 1 | 31.5 | 292 | FORWARD |
| 8 | Conveying | 3 | 72 | 120 | REVERSE |
| 9 | Conveying | 3 | 72 | 60 | REVERSE |
| 10 | Spacer* | 0 | — | 15 | — |
| 11 | Conveying | 1 | 30 | 120 | FORWARD |
| 12 | Tips | 0 | — | — | — |

*49 mm outside diameter

To the polymer syrup described above was added an initiator system comprising azobisisobutyronitrile and Lupersol 101 in amounts comprising 0.0609 mole percent and 0.0345 mole percent of the premix respectively. The premix was purged with nitrogen and added via five gallon pails to the hopper of the extruder which also had an inert gas atmosphere. No pressure was needed for the premix feed system other than static head pressure of the quantity of premix above the extruder. The extruder operated at 70 rpm, 6.5 amps and about 2900 kPa pressure at the extruder end block. Flow rate through the extruder was about 41 kilograms per hour, and the process was stable at this rate for 12 hours. The temperature profile of the twin screw extruder is shown in Table 4.

TABLE 4

| Barrel Section | 1 | 2 | 3 | 4 | 5 | End Block | Capillary Outlet |
| --- | --- | --- | --- | --- | --- | --- | --- |
| Temperature (°C.) | 150 | 170 | 154 | 140 | 145 | 162 | 171 |

The isooctylacrylate/acrylic acid PSA generated had the following properties:

| | |
| --- | --- |
| tetrahydrofuran intrinsic viscosity | 0.745 |
| conversion as measured by weight loss | 92.05 |
| conversion as measured by refractive index | 95% |
| $M_w = 1.6 \times 10^6$ | |
| $M_n = 5.7 \times 10^4$ | |
| p = 27 | |

The materials made in the larger 67 mm diameter extruder were clearer in appearance than those made in the 34 mm diameter machine. It was also noted that the polymers made using a polymer syrup as the raw material had a bimodal molecular weight distribution. That is, the product had a high molecular weight peak and a low molecular weight peak. On the other hand, PSA's made from liquid monomers had a unimodal molecular weight distribution.

EXAMPLE 3

In an effort to increase monomer reaction rates, a three-part initiator system was tried. The premix comprised a monomer blend of 95 weight percent isooctylacrylate and 5 weight percent acrylic acid to which had been added the following three initiators: 0.0176 mole percent methyltricaprylyl ammonium persulphate, 0.0177 mole percent azobisisobutyronitrile and 0.0528 mole percent Lupersol 101.

The same extruder and extruder configuration as was described in example 2 was used, except that the size of the capillary at the end of the extruder was about 1.4 mm in diameter as opposed to about 3.0 mm for the previous experiment. The machine settings may be summarized as follows:
  flow rate about 23 kilograms per hour,
  pressure at extruder end block about 3,720 kPa
  extruder rotational speed 100 rpm
  current 6.5 amps The temperature profile for this experiment is given in Table 5 below.

TABLE 5

| Barrel Section | 1 | 2 | 3 | 4 | 5 | End Block | Capillary Outlet |
|---|---|---|---|---|---|---|---|
| Temperature (°C.) | 59 | 70 | 105 | 146 | 178 | 110 | 90 |

The product polymer had the following properties:

| | |
|---|---|
| tetrahydrofuran intrinsic viscosity | 0.793 |
| conversion as measured by weight loss | 98.11% |
| conversion as measured by refractive index | 96% |
| $M_w$ = 803,000 | |
| $M_n$ = 60,800 | |
| p = 13.2 | |

With the three part initiator system described above, the conversion of 95/5 isooctylacrylate/acrylic acid PSA has been in the range of about 92 to 99 percent while polymerizing at 18 to 23 kilograms per hour.

The choice of initiator system is also a control over molecular weight distribution. Nonuniform molecular weight distribution can have adverse effects. For example, a polymer end or tail with a relatively high molecular weight as compared to most of the backbone can cause high viscosity and difficulties in hot melt adhesive applications. A low molecular weight tail can cause diffusion problems (i.e. adhesive diffusing into the substrate or other layers.)

Another experiment similar to Example 3 used a different ratio of the three initiator constituents as follows: 0.0146 mole percent methyltricaprylylammoniumpersulfate, 0.0146 mole percent azobisisobutyronitrile, and 0.0586 mole percent 2,5-dimethyl-2,5-di(t-butylperoxy)-hexane. A 97.5 percent conversion (by weight loss) was obtained, and the product had 94.5 percent solubles, $M_n$ of 70,240, $M_w$ of 1,228,000 and p of 17.5. Free acid (measured by chromatography) was 0.12% and combined acid (i.e. acid incorporated into the polymer chain) was measured at 4.45% (by the difference between total acid measured by titration and free acid). If combined acid is too low, the PSA may be too soft.

EXAMPLE 4

A continuous reaction similar to that described in Example 3 was performed with a premix comprising: 18,000 g. (90%) isooctylacrylate, 2,000 g. (10%) acrylic acid, and a three part initiator comprising 11.1 g. methyltricaprylyl ammonium persulfate, 3.28 g. azobisisobutyronitrile, and 46.4 g. Lupersol 101. The 34 mm diameter counter-rotating twin screw extruder (see Example 1) was used as the wiped surface reactor, without a PTFE coating on either the screws or the barrels. The extruder screw speed was 100 rpm at about 2.6 amps. The output was about 125 g./min. A temperature and pressure profile of the reactor is given in Table 6 below.

TABLE 6

| Barrel Section | Temperature (°C.) | Pressure (kPa) |
|---|---|---|
| Feed | 52 | 140 |
| 1 | 80 | 200 |
| 2 | 70 | 140–145 |
| 3 | 90 | 190–290 |
| 4 | 90 | |
| 5 | 90 | |
| 6 | 90 | |
| 7 | 120 | |
| 8 | 150 | |
| 9 | 154 | 6,460 |
| end block | 150 | 6,680 |
| hose | 150 | |

The product polymer had the following properties:

| | |
|---|---|
| conversion as measured by refractive index | 98% |
| conversion as measured by weight loss | 97.2% |
| inherent viscosity in THF | 1.067 |
| gel-by boiling THF test | 1.8% |
| GPC insolubles | 25% |
| $M_w = 9.2 \times 10^5$ | |
| p = 17 | |

The extruder in this example had separate barrel jacket sections with cooling water flowing through them. The low gel content illustrates the desirability of combining such water cooling with the pressurized feed and three-part initiator.

The PSA compositions prepared in accordance with the present invention are coated on flexible or inflexible backing materials by conventional hot melt coating techniques to produce coated adhesive sheet materials. Typical examples of flexible backing materials are: paper and plastic films such as polypropylene, polyethylene, polyvinylchloride, polyester, cellulose acetate and ethyl cellulose. Backings may also be prepared from fabric such as woven fabric made of nylon, cotton, rayon, glass, ceramic fibers, or non-woven fabric. The backing may also be formed of metal, metallized polymeric films, or ceramic sheet materials. The coated sheet materials may take the form of any article conventionally known to be utilized with PSA compositions such as labels, tapes, signs and covers.

Thus, this invention includes within its scope a sheet material comprising a backing member and a coating covering at least a portion of one major surface thereof, which coating comprises a normally tacky and pressure sensitive adhesive of this invention as described above. It is believed that in such sheet materials the inventive PSA's will have a decreased tendency to diffuse into or migrate through any adjacent polymeric layers, as compared to similar polymers made by solution processes.

Other embodiments of this invention will be apparent to those skilled in the art from a consideration of this specification or practice of the invention disclosed herein. Various ommisions, modifications and changes to the principles described herein may be made by one skilled in the art without departing from the true scope and spirit of the invention which is indicated by the following claims.

What is claimed is:

1. An acrylate pressure-sensitive adhesive polymer consisting essentially of a major portion derived from isooctylacrylate and a minor portion derived from at least one modifying monomer selected from the group consisting of acrylic acid, methacrylonitrile, vinyl acetate, itaconic acid, and mixtures thereof, which acrylate polymer is characterized by:
   (a) monomeric units about 70 to 99 percent of which are derived from isooctylacrylate;
   (b) a degree of polymer branching indicated by a substantial fraction of GPC insolubles comprising more than about 15 percent of the total polymer; and
   (c) a weight average molecular weight of not more than $1.6 (10^6)$.

2. A pressure sensitive adhesive article on which the adhesive is comprised at least in part of the polymer of claim 1.

3. A method of adhering a pressure-sensitive adhesive article coated with a pressure-sensitive adhesive to another article comprising applying and pressing the pressure-sensitive adhesive article onto the other article, wherein said pressure-sensitive adhesive consists essentially of a major portion derived from isooctylacrylate and a minor portion derived from at least one modifying monomer selected from the group consisting of acrylic acid, methacrylonitrile, vinyl acetate, itaconic acid, and mixtures thereof, which acrylate polymer is characterized by:
   (a) monomeric units about 70 to 99 percent of which are derived from isooctylacrylate;
   (b) a degree of polymer branching indicated by a substantial fraction of GPC insolubles comprising more than about 15 percent of the total polymer; and
   (c) a weight average molecular weight of not more than $1.6 \times 10^6$.

* * * * *